United States Patent
Gorokhov et al.

(10) Patent No.: US 9,131,486 B2
(45) Date of Patent: *Sep. 8, 2015

(54) CONTROL SIGNAL TRANSMISSION FOR WIRELESS COMMUNICATION SYSTEMS

(75) Inventors: Alexei Gorokhov, San Diego, CA (US); Arnab Das, Summit, NJ (US); Aamod Khandekar, San Diego, CA (US); Junyi Li, Bedminster, NJ (US)

(73) Assignee: QUALCOMM Incorporated, San Diego, CA (US)

(*) Notice: Subject to any disclaimer, the term of this patent is extended or adjusted under 35 U.S.C. 154(b) by 2250 days.

This patent is subject to a terminal disclaimer.

(21) Appl. No.: 11/944,123

(22) Filed: Nov. 21, 2007

(65) Prior Publication Data

US 2008/0130612 A1 Jun. 5, 2008

Related U.S. Application Data

(60) Provisional application No. 60/868,270, filed on Dec. 1, 2006.

(51) Int. Cl.
*H04W 4/00* (2009.01)
*H04B 7/216* (2006.01)
(Continued)

(52) U.S. Cl.
CPC ......... *H04W 72/0413* (2013.01); *H04L 5/0007* (2013.01); *H04L 5/0048* (2013.01); *H04L 5/0053* (2013.01); *H04L 5/0058* (2013.01); *H04B 1/707* (2013.01)

(58) Field of Classification Search
CPC ... H04L 5/0007; H04L 5/0048; H04L 5/0053; H04L 5/0058; H04B 1/707; H04W 72/0413
See application file for complete search history.

(56) References Cited

U.S. PATENT DOCUMENTS 6,754,191 B1 6/2004 Paranchych et al.
8,379,578 B2 2/2013 Gorokhov et al.
(Continued)

FOREIGN PATENT DOCUMENTS

CN 1701534 A 11/2005
EP 1463217 A1 9/2004
(Continued)

OTHER PUBLICATIONS

International Search Report—PCT/US07/085874—International Search Authority, European Patent Office—Aug. 27, 2008.
(Continued)

*Primary Examiner* — Steven H Nguyen
(74) *Attorney, Agent, or Firm* — James K. O'Hare

(57) ABSTRACT

Systems and methodologies are described that facilitate communicating reverse link control information over OFDMA control channel(s) and CDMA control channel(s). Dedicated OFDMA control channel resources can be assigned to mobile device(s). Control information related to one or more logical control channels can be generated by a mobile device. Further, a physical control channel type (e.g., OFDMA control channel or a CDMA control channel) can be selected for sending the control information via the reverse link. For example, control information associated with periodic, logical control channels can be multiplexed and sent over the OFDMA control channel (e.g., utilizing the dedicated OFDMA control channel resources) while control information related to non-periodic, logical control channels can be transmitted over the CDMA control channel.

29 Claims, 15 Drawing Sheets

(51) Int. Cl.
*H04W 72/04* (2009.01)
*H04L 5/00* (2006.01)
*H04B 1/707* (2011.01)

(56) References Cited

U.S. PATENT DOCUMENTS

| | | | |
|---|---|---|---|
| 2002/0168994 | A1 | 11/2002 | Terry et al. |
| 2004/0179469 | A1 | 9/2004 | Attar et al. |
| 2004/0266466 | A1 | 12/2004 | Kim et al. |
| 2005/0063345 | A1* | 3/2005 | Wu et al. ................ 370/335 |
| 2005/0111397 | A1 | 5/2005 | Attar et al. |
| 2005/0181799 | A1* | 8/2005 | Laroia et al. ............ 455/450 |
| 2006/0050664 | A1 | 3/2006 | Guey |
| 2007/0218889 | A1* | 9/2007 | Zhang et al. ............ 455/422.1 |
| 2007/0275665 | A1* | 11/2007 | Molnar et al. ........... 455/67.13 |
| 2008/0101211 | A1* | 5/2008 | Rao ......................... 370/335 |

FOREIGN PATENT DOCUMENTS

| | | |
|---|---|---|
| JP | 2000152321 A | 5/2000 |
| JP | 2005505954 A | 2/2005 |
| JP | 2005505993 A | 2/2005 |
| JP | 2007536827 T | 12/2007 |
| JP | 2008526139 A | 7/2008 |
| RU | 2214684 | 10/2003 |
| WO | WO-9950977 | 10/1999 |
| WO | WO-03032586 | 4/2003 |
| WO | WO-2004084450 | 9/2004 |
| WO | WO-2005048640 A1 | 5/2005 |
| WO | WO2005109792 A1 | 11/2005 |
| WO | 2006000094 | 1/2006 |
| WO | WO2006069399 | 6/2006 |
| WO | 2006098574 | 9/2006 |
| WO | WO-2006098674 A1 | 9/2006 |
| WO | WO-2006124336 A2 | 11/2006 |

OTHER PUBLICATIONS

Written Opinion—PCT/US07/085874—International Search Authority, European Patent Office—Aug. 27, 2008.
International Search Report—PCT/US07/085874—International Search Authority, European Patent Office, Jun. 6, 2008.
Taiwan Search Report—TW096145770—TIPO—May 22, 2011.
European Search Report—EP11008309—Search Authority—The Hague—Nov. 15, 2011.
NTT DOCOMO "Basic Multiplexing Schemes of Multiple L1/L2 Control information in E-UTRA Downlink" 3GPP TSG RAN WG1 Meeting #47, Nov. 6 2006, R1-063325.
NTT DoCoMo, et al., "Multiplexing Method of Shared Control Channel in Uplink Single-Carrier FDMA Radio Access," TSG RAN WG1 #42bis, Document #R1-051143 (Original R1-050591), pp. 1-9, XP002450609, Oct. 10-14, 2005.
Taiwan Search Report—TW100134860—TIPO—Nov. 22, 2013.

* cited by examiner

CONTROL SIGNAL TRANSMISSION FOR WIRELESS COMMUNICATION SYSTEMS

CROSS-REFERENCE TO RELATED APPLICATIONS

This application claims the benefit of U.S. Provisional Patent application Ser. No. 60/868,270 entitled "CONTROL SIGNAL TRANSMISSION FOR WIRELESS COMMUNICATION SYSTEMS" which was filed Dec. 1, 2006. The entirety of the aforementioned application is herein incorporated by reference.

BACKGROUND

I. Field

The following description relates generally to wireless communications, and more particularly to employing OFDMA control channels and CDMA control channels to transfer control information in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

OFDM based techniques effectively partition overall system bandwidth into multiple orthogonal subcarriers. These subcarriers can also be referred to as tones, bins, and frequency channels. Each subcarrier can be modulated with data. With time division based techniques, each subcarrier can comprise a portion of sequential time slices or time slots. Each user can be provided with one or more time slot and subcarrier combinations for transmitting and receiving information in a defined burst period or frame. The hopping schemes can generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, where a user's stream of bits is encoded and spread across a very wide channel in a pseudo-random fashion. The receiver is designed to recognize the associated unique sequence code and undo the randomization in order to collect the bits for a particular user in a coherent manner.

Typically, in conventional systems, reverse link control channels tend to be CMDA control channels. However, when multiple periodic channels are employed per user, overhead associated with the CMDA control channels can be substantial. Thus, these conventional techniques can encounter limited capacity when multiple periodic channels per user are supported.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating communication of reverse link control information over OFDMA control channel(s) and CDMA control channel(s). Dedicated OFDMA control channel resources can be assigned to mobile device(s). Control information related to one or more logical control channels can be generated by a mobile device. Further, a physical control channel type (e.g., OFDMA control channel or a CDMA control channel) can be selected for sending the control information via the reverse link. For example, control information associated with periodic, logical control channels can be multiplexed and sent over the OFDMA control channel (e.g., utilizing the dedicated OFDMA control channel resources) while control information related to non-periodic, logical control channels can be transmitted over the CDMA control channel.

According to related aspects, a method facilitates transmitting control information upon a reverse link in a wireless communication system is described herein. The method can include generating control information to be communicated upon a reverse link. Further, the method can comprise selecting a physical control channel type for transmitting the control information as a function of the control information. Moreover, the method can include sending the control information over the selected type of physical control channel.

Another aspect relates to an apparatus that operates in a wireless communication system. The apparatus can include at least one processor configured to generate control information to be sent via a reverse link, select a physical control channel type for sending the control information as a function of the control information, and transmit the control information over the selected type of physical control channel. Further, the apparatus can include a memory coupled to the at least one processor.

Yet another aspect relates to a wireless communications apparatus that enables communicating control information over a reverse link in a wireless communication environment. The wireless communications apparatus can include means for generating a control message related to a reverse link logical control channel. Further, the wireless communications apparatus can comprise means for selecting a physical control channel type for sending the control message as a function of the control message. Moreover, the wireless communications apparatus can include means for transmitting the control message via the selected physical control channel type.

Still another aspect relates to a computer program product that can comprise a computer-readable medium, which can comprise code for causing at least one computer to generate a control message related to a reverse link logical control channel; code for causing the at least one computer to select a physical control channel type for sending the control message as a function of the control message, the physical control channel type being one of an OFDMA control channel or a CDMA control channel; and code for causing the at least one computer to transmit the control message via the selected physical control channel type.

According to other aspects, a method that facilitates obtaining control data via a reverse link control channel is described herein. The method can include assigning OFDMA resources to a mobile device for communicating one or more periodic, reverse link logical control channels. Moreover, the method can include regulating minimum average rates for the mobile device to send the one or more periodic, reverse link logical control channels upon the assigned OFDMA resources. Further, the method can comprise receiving multiplexed data via the assigned OFDMA resources that includes at least a subset of the one or more periodic, reverse link logical control channels.

Yet another aspect relates to an apparatus that operates in a wireless communication system. The apparatus can include at least one processor configured to assign OFDMA control channel resources to a mobile device for use with one or more periodic, reverse link logical control channels, regulate minimum average rates for the mobile device to communicate reports pertaining to the one or more periodic, reverse link logical control channels, and obtain multiplexed data over the assigned OFDMA control channel resources that includes reports pertaining to at least a subset of the one or more periodic, reverse link control channels. Further, the apparatus can include a memory coupled to the at least one processor.

Another aspect relates to a wireless communications apparatus that enables assigning reverse link OFDMA control channel resources in a wireless communication environment. The wireless communications apparatus can include means for assigning dedicated resources to a mobile device. Further, the wireless communications apparatus can comprise means for regulating minimum average rates for reporting control information related to one or more reverse link logical control channels. Moreover, the wireless communications apparatus can include means for obtaining multiplexed data via the assigned dedicated resources that includes control information related to at least a subset of the one or more reverse link logical control channels.

Still another aspect relates to a computer program product that can comprise a computer-readable medium, which can comprise code for causing at least one computer to assign dedicated resources to a mobile device; code for causing the at least one computer to regulate minimum average rates for reporting control information related to one or more reverse link logical control channels; and code for causing the at least one computer to receive multiplexed data via the assigned dedicated resources that includes control information related to at least a subset of the one or more reverse link logical control channels.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
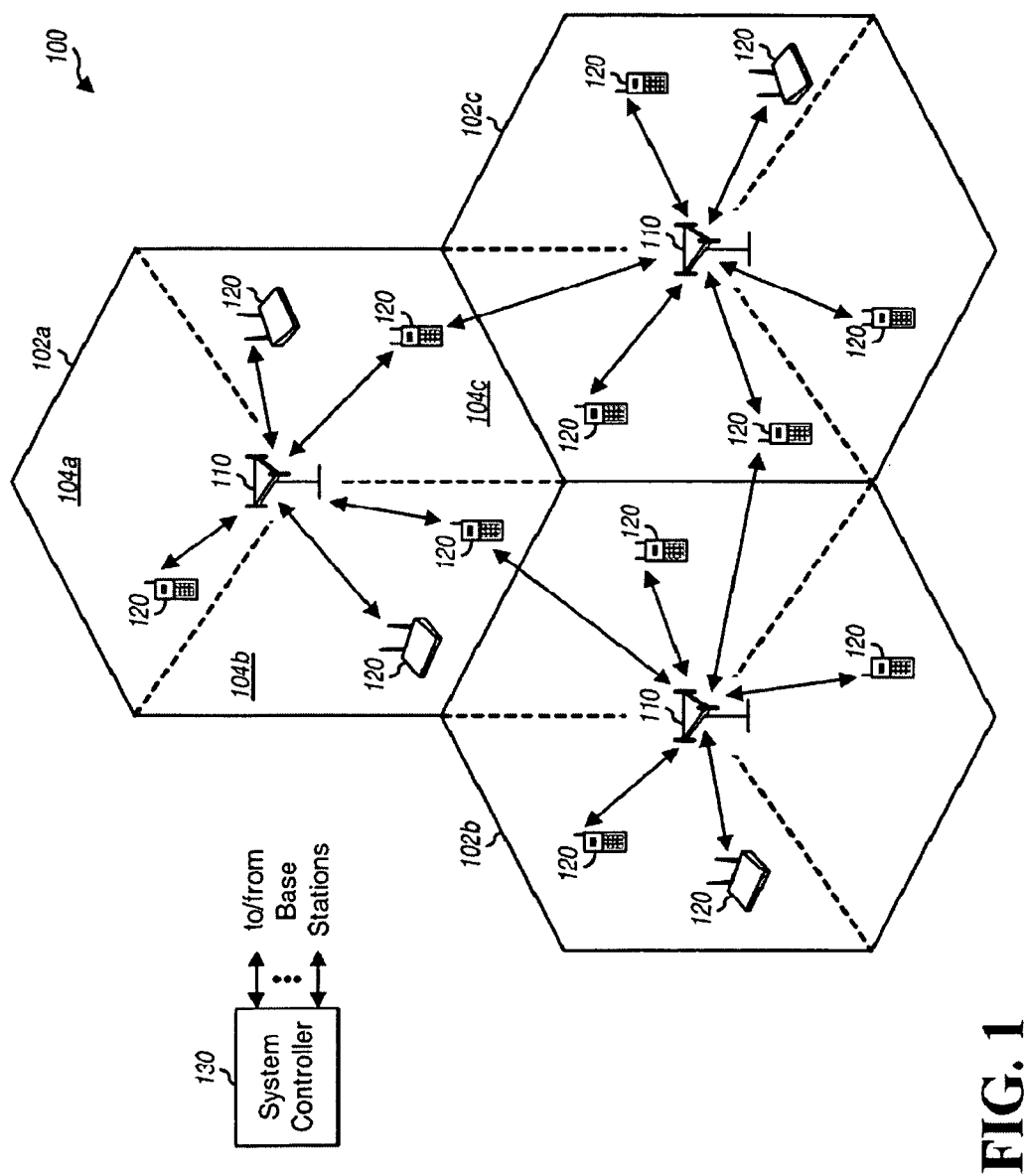
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 includes multiple base stations 110 and multiple mobile devices 120. A base station 110 is a station that communicates with one or more mobile devices 120. A base station 110 can also be called, and can include some or all of the functionality of, an access point, a Node B, and/or some other network entity. Each base station 110 provides communication coverage for a particular geographic area 102. The term "cell" can refer to a base station 110 and/or its coverage area 102 depending on the context in which the term is used. To improve system 100 capacity, a base station coverage area 102 can be partitioned into multiple smaller areas (e.g., three smaller areas 104a, 104b, and 104c). Each smaller area 104 is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The signaling transmission techniques described herein can be used for a system with sectorized cells as well as a system with un-sectorized cells. For simplicity, in the following description, the term "base station" is used generically for a station that serves a sector as well as a station that serves a cell.

Mobile devices 120 are typically dispersed throughout the system 100, and each mobile device 120 can be fixed or mobile. A mobile device 120 can also be called, and can include some or all of the functionality of, a mobile station, user equipment, and/or some other device. A mobile device 120 can be a wireless device, a cellular phone, a personal digital assistant (PDA), a wireless modem card, and so on. A mobile device 120 can communicate with zero, one, or multiple base stations 110 on the forward and reverse links at any given moment.

For a centralized architecture, a system controller 130 couples to base stations 110 and provides coordination and control for these base stations 110. System controller 130 can be a single network entity or a collection of network entities. For a distributed architecture, the base stations 110 can communicate with one another as needed.

Controller 130 can provide one or more connections to multiple networks (e.g., the Internet, other packet based networks, circuit switched voice networks that provide information to and/or from mobile devices 120 in communication with base stations 110 of the multiple access wireless communication system 100, . . . ). Controller 130 can include and/or can be coupled with a scheduler that schedules transmission from and/or to mobile devices 120. Additionally or alternatively, the scheduler can reside in each individual base station 110, sectors of cells, etc.

For communicating control information from mobile devices 120 to base stations 110, one of two different types of physical layer channelization can be utilized. One type of physical layer channelization is a CDMA channelization, where multiple mobile devices 120 use different orthogonalization codes, or group of codes, with the same or partially overlapping time and frequency resources for a transmission. Another type of physical layer channelization is an OFDM orthogonalization, where a specific allocation of time and frequency subcarriers is assigned to a mobile device 120 that is different than time and frequency subcarriers allocated to any other mobile device 120 during some time period (e.g., a frame or a slot). In some aspects, different types of control information is assigned to, and thus scheduled on, different physical layer channels.

It should be noted that while FIG. 1 depicts physical sectors (e.g., having different antenna groups for different sectors), other approaches can be utilized. For example, utilizing multiple fixed "beams" that each cover different areas of the cell in frequency space can be employed in lieu of, or in combination with physical sectors.

In some aspects, a forward link transmission is divided into units of superframes. A superframe can include a superframe preamble followed by a series of frames. In an FDD system, the reverse link and the forward link transmission can occupy different frequency bandwidths so that transmission on the links do not, or for the most part do not, overlap on any frequency subcarriers. In a TDD system, N forward link frames and M reverse link frames define the number of sequential forward link and reverse link frames that can be continuously transmitted prior to allowing transmission of the opposite type of frame. It should be noted that the number of N and M can vary within a given superframe or between superframes.

In both FDD and TDD systems, each superframe can include a superframe preamble. In certain embodiments, the superframe preamble includes a pilot channel that includes pilots that can be used for channel estimation by mobile devices 120 and a broadcast channel that includes configuration information that mobile devices 120 can employ to demodulate information carried on the forward link. Further acquisition information such as timing and other information sufficient for mobile device 120 to communicate and basic power control or offset information can also be included in the superframe preamble. In other cases, only some of the above and/or other information can be included in this superframe preamble.

In certain aspects, the broadcast information can include the information or assignment of any OFDMA control channels. This information can be utilized by mobile devices 120 to prevent transmission of reverse link data transmissions on those channels or locations that are assigned to the OFDMA control channels, even if that same channel or location is assigned to the mobile device 120 for reverse link data transmission.

Figure 2:
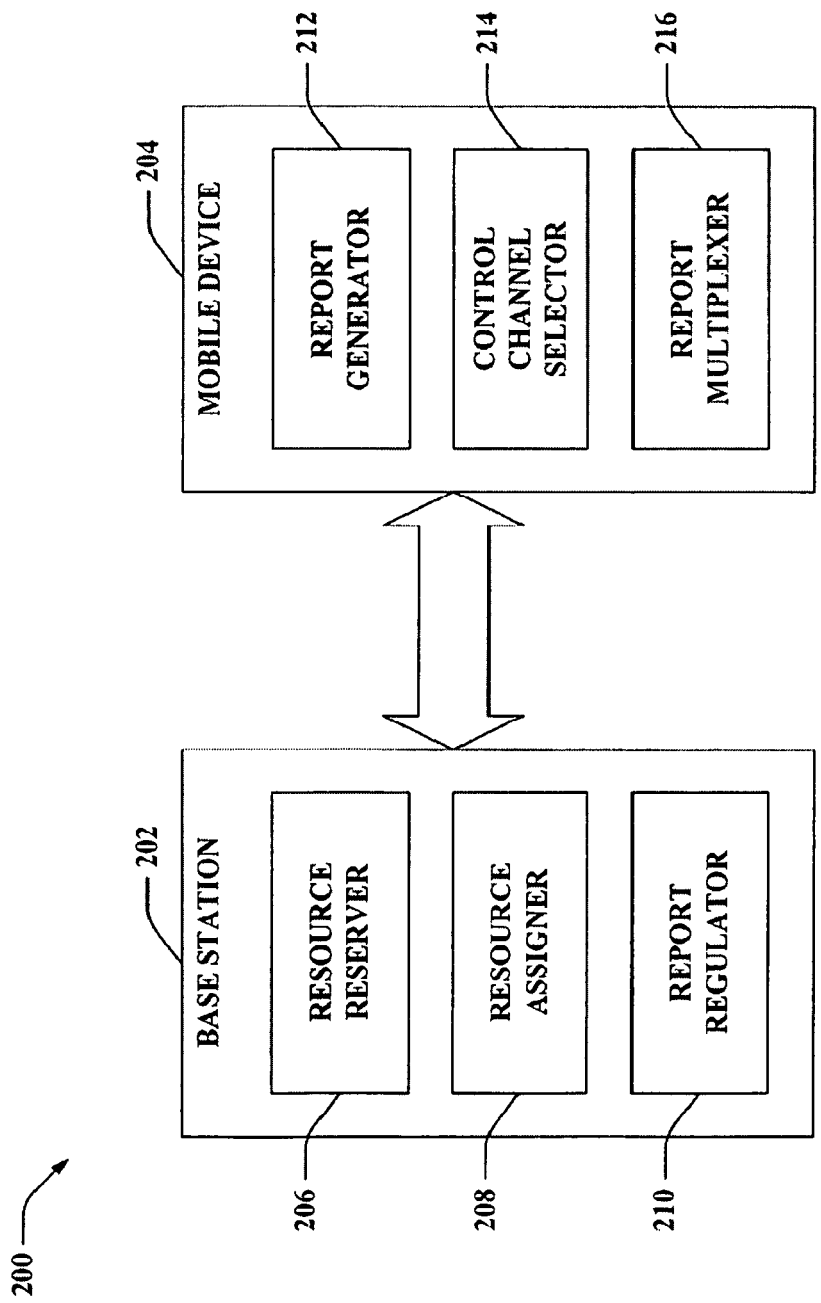
FIG. 2 is an illustration of an example system that enables communicating control information over a reverse link via OFDMA dedicated control channel(s) and CDMA control channel(s).

Now turning to FIG. 2, illustrated is a system 200 that enables communicating control information over a reverse link via OFDMA dedicated control channel(s) and CDMA control channel(s). System 200 includes a base station 202 that communicates with a mobile device 204. Further, it is contemplated that base station 202 can communicate with any number of disparate mobile device(s) (not shown).

Base station 202 includes a resource reserver 206, a resource assigner 208, and a report regulator 210. Resource reserver 206 can reserve resources system wide; thus, base station(s), mobile device(s), various network device(s), and the like in a wireless communication environment can have a common understanding of these resources being reserved. For instance, resource reserver 206 can enable reverse link dedicated OFDMA control channel (R-ODCCH) segments to be reserved. The R-ODCCH segments can thereafter be employed by mobile device 204 and/or any disparate mobile devices to transmit various periodic feedback channels to base station 202 (and/or any disparate base station (not shown)). Resource reserver 206 can enable R-ODCCH resources to be allocated in units of two R-DCH channels on any reverse link (RL) interlace. Accordingly, second order diversity can be provided for every R-ODCCH segment. Further, granularity of ~6.6% per interlace or ~0.83% system wide can be yielded. Moreover, four R-ODCCH segments can be accommodated by employing such an allocation by resource reserver 206. Pursuant to another illustration, resource reserver 206 can allocate the R-ODCCH segments in units of 16 channels. Although depicted as being included in base station 202, it is contemplated that resource reserver 206 can additionally or alternatively be included in a system controller (e.g., system controller 130 of FIG. 1), disparate base station(s), one or more nodes in a network, and the like.

Resource assigner 208 can select to allot particular reserved resource(s) (e.g., a dedicated R-ODCCH segment, . . . ) to a chosen user (e.g., mobile device 204, disparate mobile device(s), . . . ). Moreover, resource assigner 208 can individually assign the particular reserved resource(s) through upper layer signaling of assignment messages. A dedicated R-ODCCH segment can be assigned and/or de-assigned to mobile device 204 (or a disparate mobile device) within a forward link serving sector associated with base station 202. For instance, message based assignment or de-assignment per mobile device can be employed by resource assigner 208. Moreover, resource assigner 208 can advertise sector-wide reservation of R-ODCCH resources in units of 16 segments on a broadcast channel. Further, resource assigner 208 can transfer assignment messages that specify information related to an R-ODCCH segment ID within an interlace, an interlace index, R-ODCCH periodicity and phase, and the like. According to an illustration, multiple mobile devices (e.g., mobile device 204 and/or disparate mobile device(s)) can be multiplexed on the same (segment ID, interlace) pair if each of these multiple mobile devices are assigned different phases.

Mobile device 204 can be assigned reserved resources (e.g., an R-ODCCH segment); a plurality of logical channels can be multiplexed upon the reserved resources (e.g., the assigned R-ODCCH segment can be utilized to multiplex different logical channels thereupon). Report regulator 210 of base station 202 can provide a minimum average rate that each periodic report can be provided upon the reserved resources. Thus, report regulator 210 need not specify which specific reports to combine in a particular control segment. Instead, report regulator 210 can send information that controls the minimum average rate at which each of a plurality of disparate reports are communicated from mobile device 204. Mobile device 204 can consider such information when selecting which reports to combine to meet the minimum average rate requirements as described below.

Mobile device 204 can further include a report generator 212, a control channel selector 214, and a report multiplexer 216. Report generator 212 can utilize the minimum average rate information to select which reports to yield. The reports can provide feedback from mobile device 204 to base station 202. Moreover, the reports can be communicated via logical control channel. According to an illustration, a payload of an assigned reserved resource (e.g., R-ODCCH) can carry multiplexed logical channel(s).

For example, the control channels can include a reverse link broadband channel quality indictor channel (r-cqich), a reverse link subband feedback channel (r-sfch) that can enable subband scheduling, a reverse link precoding feedback for close loop beamforming and SDMA channel (r-bfch), a single codeword reverse link MIMO channel quality indicator channel (scw r-mqich), a multi-codeword reverse link MIMO channel quality indicator channel (mcw r-mqich), and/or a reverse link request channel (r-reqch) that can request RL resource allocation from the RL serving base station. Additional control channels can include a reverse link pilot channel (r-pich), r-pahch that indicates mobile device power headroom with regards to the r-pich power, r-psdch that indicates power spectral density based on relative channel strength to non-serving base stations and interference control signaling (e.g., f-osich) by these base stations, handoff r-cqich that provides channel quality reports sent to a desired forward link server, handoff r-reqch that provides reverse link resource requests sent to a desired reverse link server, and r-ach that can be an access channel for random access and access based handoff.

Control channel selector 214 can select a type of control channel for communicating a report that includes control information. For instance, control channel selector 214 can transmit a first subset of the reports via an OFDM control channel and a second subset of the reports via a CDMA control channel. Control channel selector 214 can utilize dedicated OFDMA control segments for transmitting periodic feedback channels, for instance. Thus, if mobile device 204 carries r-cqich, r-reqch, r-psdch and r-pahch feedback channels, such mobile device 204 need not have a dedicated OFDMA segment; rather, the CDMA control channel can be selected and employed by control channel selector 214. However, control channel selector 214 can select to utilize the OFDM control channel for r-mqich, r-sfch, r-bfch, r-cqich, and r-reqch; thus, these channels can be transmitted over the OFDM control channel rather than the CDMA control channel by employing control channel selector 214. Control channel selector 214 can also allow r-reqch to be sent in a CDMA control segment even when an OFDMA segment is available since latency associated with requests can thus be reduced. Moreover, control channel selector 214 can allow r-pich, r-ach, as well as r-cqich and r-reqch that are sent to non-forward link serving sectors to be communicated on CDMA control segments.

Report multiplexer 216 can multiplex various logical channels upon the assigned reserved resources (e.g., R-ODCCH segment(s)). Report multiplexer 216 can combine multiple control channels into a dedicated OFDMA segment for sending to base station 202. Thus, individual payloads can be combined to minimize pilot overhead.

Report multiplexer 216 can employ a maximum payload of 22 bits for various combinations of channels. A minimum header of 3 bits can also be utilized by report multiplexer 216. The following table shows various combinations of channels and corresponding header values.

| Header value | r-cqich (4 bits) | r-reqch (6 bits) | r-sfch (8 bits) | r-bfch (8 bits) | scw r-mqich (7 bits) | mcw r-mqich (4 bits/layer) | Total payload |
|---|---|---|---|---|---|---|---|
| 000 | 1 | 0 | 1 | 1 | 0 | 0 | 20 |
| 001 | 1 | 0 | 2 | 0 | 0 | 0 | 20 |
| 010 | 1 | 1 | 1 | 0 | 0 | 0 | 18 |
| 011 | 1 | 1 | 0 | 1 | 0 | 0 | 18 |
| 100 | 1 | 0 | 1 | 0 | 1 | 0 | 19 |
| 011 | 1 | 0 | 0 | 1 | 1 | 0 | 19 |
| 100 | 1 | 1 | 0 | 0 | 1 | 0 | 17 |
| 011 | 1 | 0 | 0 | 0 | 0 | 4 | 20 |
| 100 | 0 | 1 | 0 | 0 | 0 | 4 | 22 |

Control segment selector 214 and report multiplexer 216 can enable request channels to be multiplexed upon OFDM control channels. Multiplexing r-reqch on R-ODCCH can alleviate CDMA control segment loading in the event of congestion and/or service delay by a reverse link serving sector. Mobile device 204 (e.g., via employing control channel selector 214) can use an R-ODCCH segment that is available within a certain delay from an arrival of a request, where the delay can be configurable by base station 202. Moreover, mobile device 204 (e.g., via utilizing control channel selector 214) can use r-reqch on a CDMA control segment if the R-ODCCH is not available within the specified delay. The aforementioned can enable short latency of an initial request along with the tradeoff between R-ODCCH usage for r-reqch and CDMA sub-segment congestion.

According to another example, mobile device 204 can stop transmitting r-cqich upon a CDMA control channel to a forward link serving sector once an assignment for an R-ODCCH segment is received (e.g., from resource assigner 208 of base station 202). Upon assigning the R-ODCCH segment to mobile device 204, base station 202 can continue to search for r-cqich communicated via CDMA segments and on the assigned R-ODCCH until the R-ODCCH is detected. Similar logic can also be applied for de-assignment of R-ODCCH.

Power control on R-ODCCH can be similar to R-ACKCH power control. For instance, r-pich can be used as a reference level when a forward link serving sector (FLSS) coincides with a reverse link serving sector (RLSS). As such, fast closed loop power control can be based on f-pcch commands. Further, f-pqich reports from FLSS can be employed when the FLSS is different from the RLSS. Accordingly, a slow closed loop power control can be supported based on filtered pilot strength reports. Moreover, filtered f-iotch reports can be leveraged from the FLSS to adjust for an interference level seen on an OFDMA segment. A user specific offset assigned through an active set update message can also be applied to provide slow adjustments to user-specific channel conditions. Moreover, a sector (FLSS) specific offset can be advertised on a broadcast channel (e.g., ECI) and can thereafter be applied to provide slow adjustment based on sector-specific interference over thermal (IoT) tail behavior.

According to another illustration, CDMA control sub-segment size can be 1.25 MHz; however, the claimed subject matter is not so limited. Moreover, the CDMA control channel can offer gains in the case of event-driven channels with low average duty cycle and low latency requirements. Further, the OFDMA control channel can offer gains for periodic channels. OFDMA channelization of periodic channels can yield non-negligible savings in overhead when the number and/or frequency of periodic channels are high (e.g., when FLSS uses sub-band scheduling, preceding, MIMO, . . . ). As such, the OFDMA control channel design can offer at least a two-fold capacity advantage over CDMA for periodic channels, for example. Moreover, efficient multiplexing of periodic channels in single-input single-output (SISO), SCW and MCW modes can be yielded.

Figure 3:
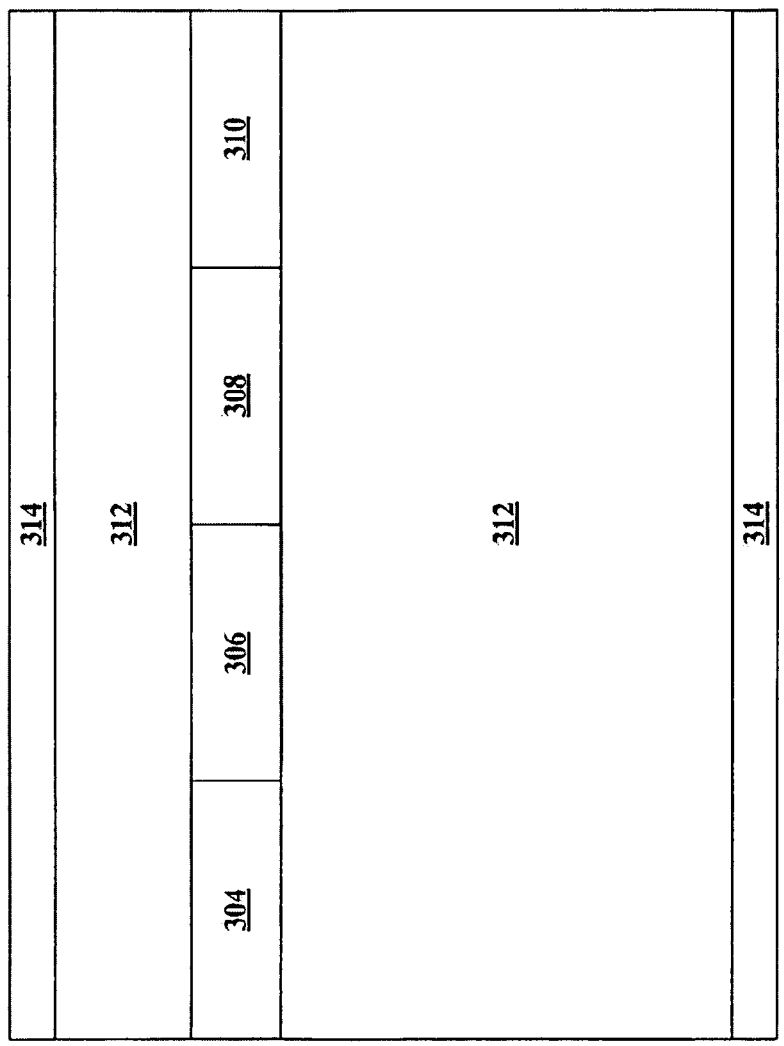
FIG. 3 is an illustration of an example forward link frame for a multiple access wireless communication system.
Figure 4:
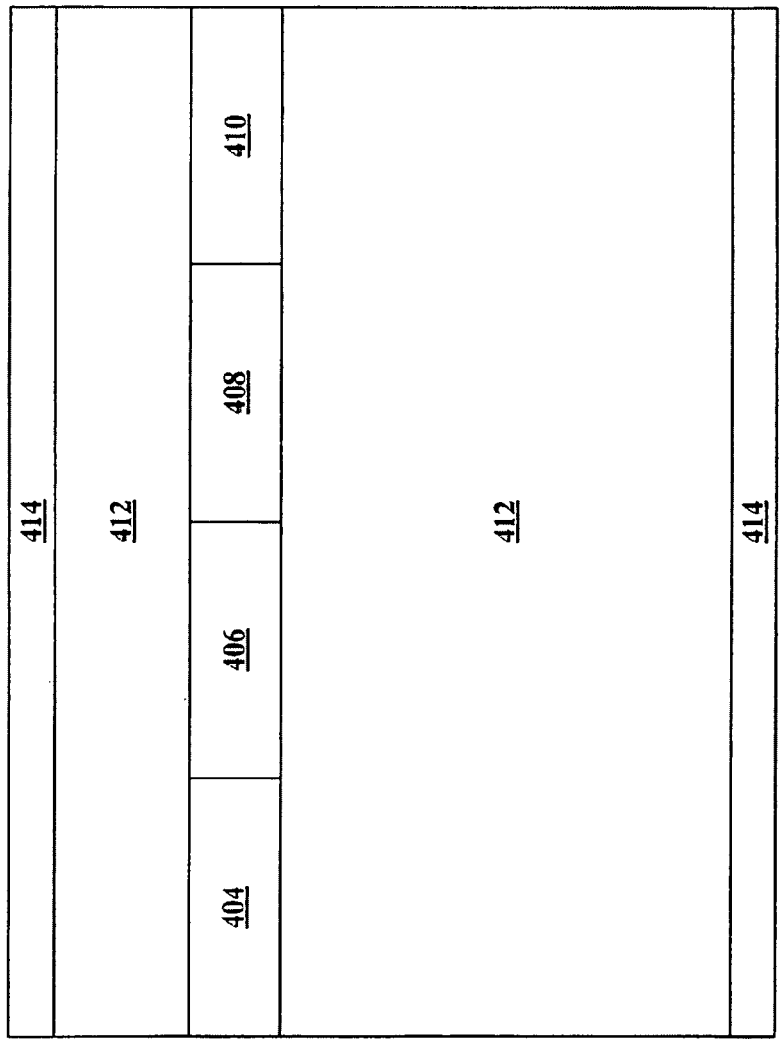
FIG. 4 is an illustration of an example reverse link frame for a multiple access wireless communication system.

Turning to FIGS. 3 and 4, illustrated are frames for a multiple access wireless communication system. FIG. 3 depicts a forward link frame 302 and FIG. 4 depicts a reverse link frame 402. Each frame 302 and 402 can include a same or a different number of OFDM symbols, which can constitute a number of subcarriers that can simultaneously be utilized for transmission over some defined period. Further, each frame 302 and 402 can operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

One or more forward link frames 302 and/or reverse link frames 402 can each be part of one or more superframes. Each forward link frame 302 includes control channels 304-310. Each of the control channels 304-310 can include information for functions related to, for example, acquisition; acknowledgements; forward link assignments for each mobile device, which can be different or the same for broadcast, multicast, and unicast message types; reverse link assignments for each mobile device; reverse link power control for each mobile device; and reverse link acknowledgements. It should be noted that more or fewer of such functions can be supported in control channels 304-310. Also, control channels 304-310 can hop in each frame according to hopping sequences that are the same or different from hopping sequences assigned to data channels.

In addition, each reverse link frame 402 can include one or more reverse link control channels 404-410, which can include feedback channels, pilot channels for reverse link channel estimation, and acknowledgement channels that can be included in the reverse link transmission. Each of the reverse link control channels 404-410 can include information for functions related to, for example, forward link and reverse link resource requests by each mobile device; channel information (e.g., channel quality information (CQI)) for different types of transmission; and pilots from the mobile devices that can be used by the base station for channel estimation purposes. It should be noted that more or fewer of such functions can be supported in control channels 404-410. Also, reverse link control channels 404-410 can hop in each frame according to hopping sequences that are the same or different from hopping sequences assigned to data channels.

In certain aspects, to multiplex users on the reverse link control channels 404-410, one or more orthogonal codes, scrambling sequences, or the like can be utilized to separate each user and/or different types of information transmitted in the reverse link control channels 404-410. These orthogonal codes can be user specific or can be allocated by the base station to each mobile device per communication session or shorter period (e.g., per superframe).

In other aspects, some reverse link control channels 404-410 can be OFDMA control channels where one or more users are assigned orthogonal resources in terms of subcarriers and OFDM symbols, while other control channels 404-410 are CDMA control channels where multiple users are assigned the same resources of subcarriers and OFDM symbols but user different orthogonal codes, scrambling sequences, or the like from each other.

Referring again to FIG. 3, aspects of forward link frame 302 for a multiple access wireless communication system are illustrated. As shown, each forward link frame 302 is further divided into multiple segments. The first, a control channel, which may or may not comprise a contiguous group of subcarriers, has a variable number of subcarriers assigned depending on the desired amount of control data and other considerations. The remaining portions 312 are generally available for data transmission. Control channel can include one or more pilot channels 304 and 306. In symbol rate hopping mode, the pilot channels 304 and 306 can be present on all of the OFDM symbols in each forward link frame 302, and need not be included in the control channel in those instances. In both cases, a signaling channel 308 and a power control channel 310 can be included in the control channel. The signaling channel 308 can include assignment, acknowledgement, and/or power references and adjustments for data, control, and pilot transmissions on the reverse link.

Power control channel 310 can carry information regarding interference generated at other sectors due to transmissions from mobile devices of that sector. Also, in certain aspects, subcarriers 314 at edges of the entire bandwidth can function as quasi-guard subcarriers.

It should be noted that where multiple transmit antennas can be used to transmit for a sector, the different transmit antennas should have the same superframe timing (including the superframe index), OFDM symbol characteristics, and hop sequence. Further, in some aspects, the control channel 304-310 can comprise the same allocation as a data transmission (e.g., if data transmissions are block hopped then blocks of the same or different sizes can be allocated for the control channel 304-310).

Referring again to FIG. 4, aspects of a reverse link frame 402 for a multiple access wireless communication system are illustrated. Physical control channels 404-410 can include different logical control channels as their payload. The logical control channels include r-pahch, which indicates a power headroom of a mobile device (e.g., with respect to a reverse link pilot channel). For instance, feedback of this information can be constrained based on a number of reports per a certain number of slots and on the minimum amount of change in the value from the previous (in-band) report. Another logical channel can be r-psdch that indicates power spectral density, or similar information, based on relative channel strength to non-serving base stations and interference control signaling by the non-serving base stations. For example, transmission of the r-psdch can be constrained based on a number of reports per certain number of slots and on the minimum amount of change in the value from the previous (in-band) report.

Other reverse link logical channels can include event driven channels that persist until feedback is provided from the base station. These include r-reqch that requests a reverse link resource allocation, and generally persists until resource allocation is provided via an assignment. Another such logical channel is r-cqich, which can comprise a channel quality report sent to a desired forward link serving sector and that generally persists until handoff is granted. Additionally, a handoff r-reqch can be included, which according to various aspects is a resource request sent to a desired reverse link serving sector that generally persists until handoff is granted. Further, R-ACH can be included, which can be used as an access channel for random access and access based handoff.

Pursuant to further illustrations, a logical control channel can be included that comprises reverse link pilot channels used by a base station, potentially along with other information, to provide power control reference and for quality measurements for base station instructed handoff. For instance, r-cqich can be a broadcast channel quality indicator; r-sfch can provide subband (e.g., groups of subcarrier(s)) selection or feedback that is used to enable subband scheduling; r-bfch can provide precoding feedback for closed loop beamforming and/or Space Division Multiple Access (SDMA); and r-mqich can provide MIMO channel quality feedback, allowing for differentiation of channel quality between different streams transmitted to a single mobile device. Transmission of these channels can be constrained based on the number of reports per certain number of slots.

The different logical channels can be periodic, required to report at regular instance, event driven, or some combination as discussed above. The periodicity can leverage different erasure rates at the base station of these channels. The remaining portions 412 are generally available for data transmission. Also, in certain aspects, subcarriers 414 at edges of the entire bandwidth can function as quasi-guard subcarriers.

It should be noted that while FIGS. 3 and 4 depict different channels that make up control channels as being multiplexed in time, this need not be the case. The different channels that make up control channels can be multiplexed using different orthogonal, quasi-orthogonal, or scrambling codes, different frequencies, or any combinations of time, code, and frequency. Also, as discussed herein, the slots can be one or more OFDM symbols of a given frame, which may or may not be contiguous in time.

Further, the channels discussed with respect to FIGS. 3 and 4 can be messages and/or physical resources. Further, the physical channel resources assigned for a given mobile device for feedback can be used for one or more of the different messages (e.g., information channels, . . . ).

Figure 5:
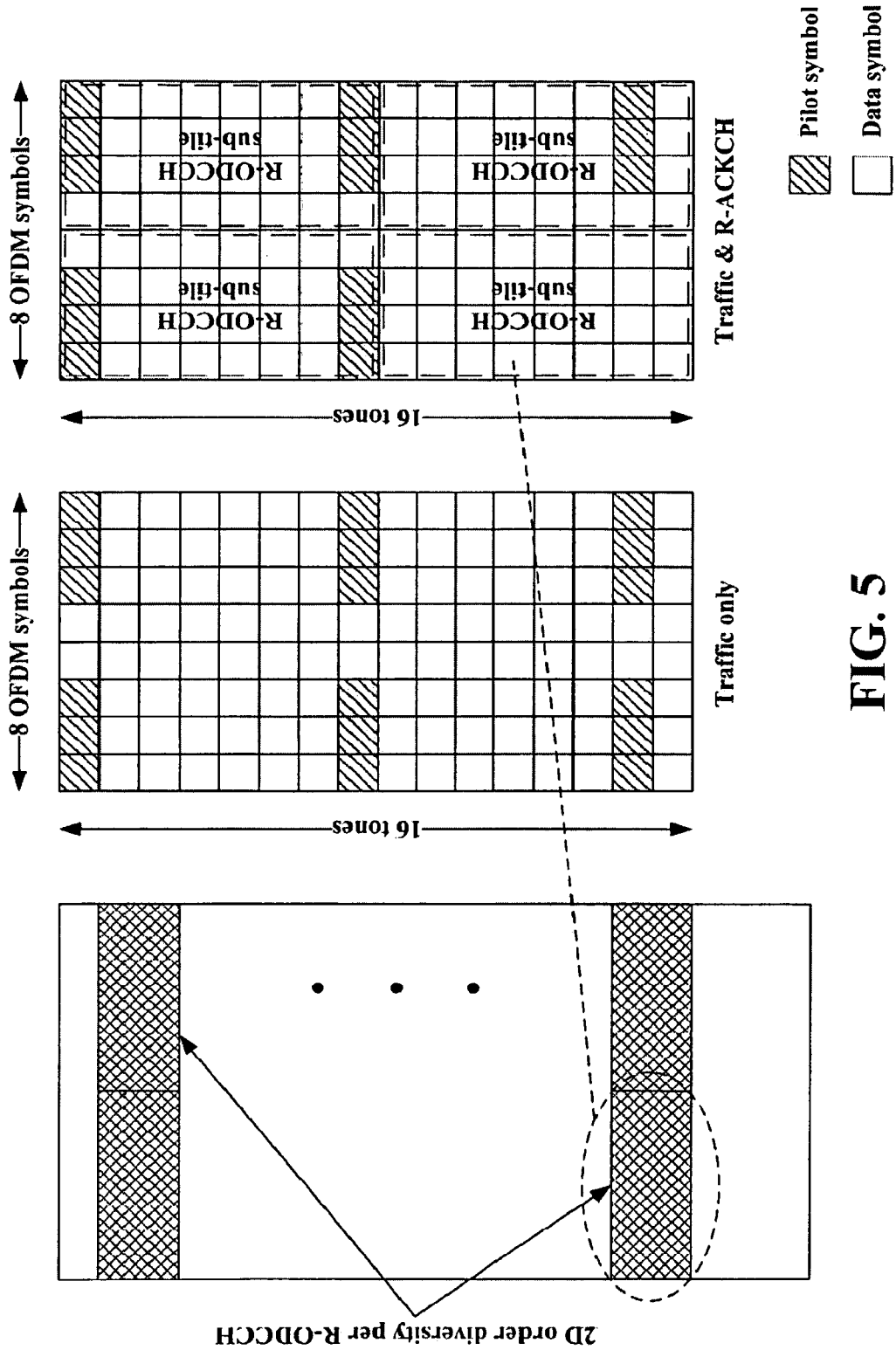
FIG. 5 is an illustration of an example OFDM control channel.

Referring now to FIG. 5, illustrated is an OFDM control channel (e.g., R-ODCCH). In FIG. 5, an OFDM control channel includes a plurality of tiles, which can comprise allocations of some number of subcarriers (e.g., 16 tones) over some number of OFDM symbols (e.g., 8 OFDM symbols). This type of allocation can be similar to that utilized for data channel resource allocation to allow for easier resource scheduling; however, the claimed subject matter is not so limited as differing allocations for the control channel resource(s) and data channel resource(s) can be supported.

Each OFDM control channel can carry a payload that enables multiplexing various logical channels or control information types. For instance, a total payload of 22 bits plus a 3 bit header can be utilized to define the one or more multiplexed logical channels that are part of the physical channel. The physical channel for a given mobile device can be ¼ of the resources of a tile. These messages can use a 9 bit cyclic redundancy check (CRC) to secure a low undetected error rate. Further, the physical channel resources used by a given mobile device for reverse link control transmission can include sub-tiles (e.g., portions) of at least two tiles in order to provide second order fading and interference diversity; each R-ODCCH segment can include two sub-tiles placed in two R-DCH tiles. For example, each sub-tile can include 8 tones over 4 OFDM symbols, which provide 32 modulation symbols per mobile device in a sub-tile. Further, random hopping of sub-tiles across bandwidth (e.g., by hopping the tiles) can be provided in order to improve diversity.

Figure 6:
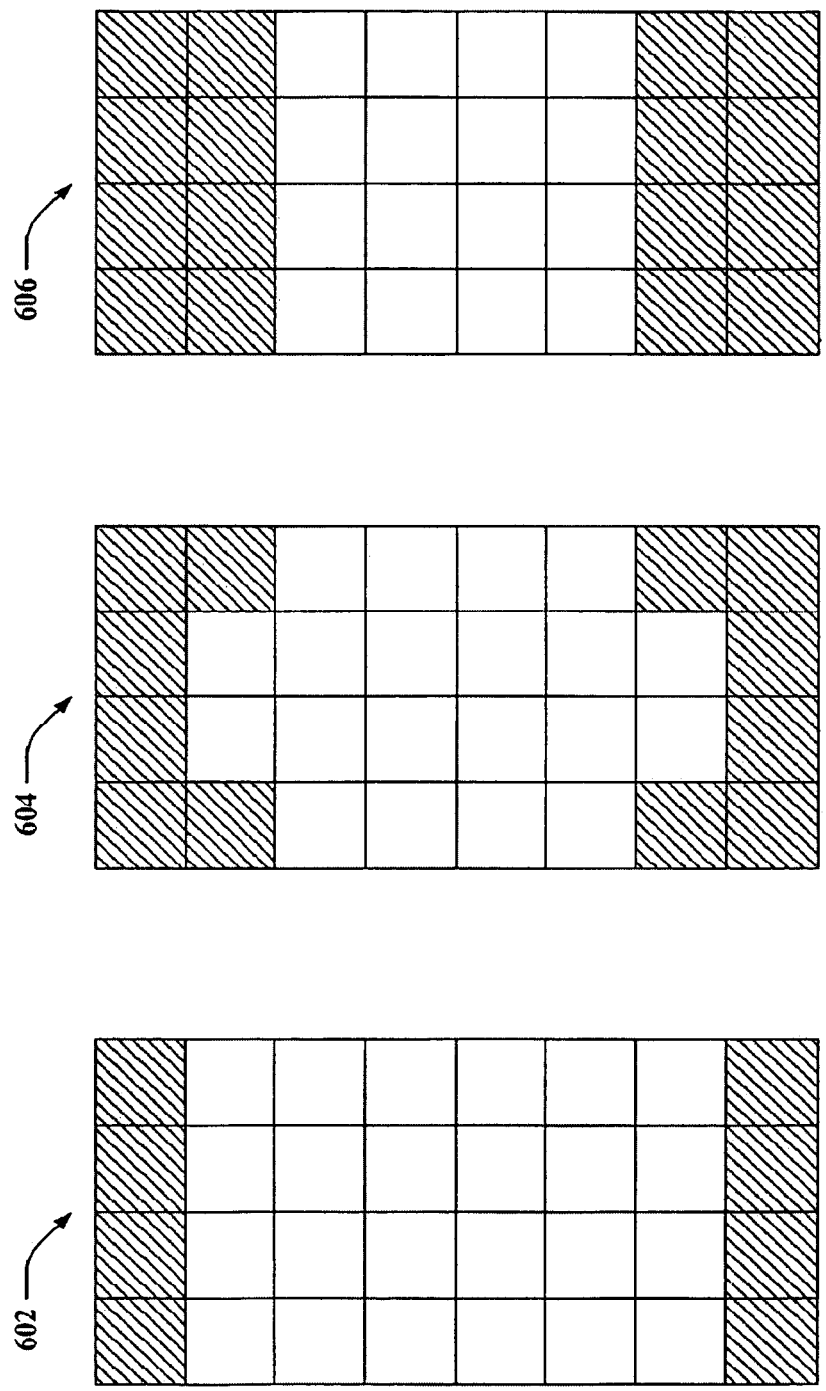
FIG. 6 is an illustration of an example of various pilot formats utilized for OFDM control channels.

Turning to FIG. 6, illustrated are various pilot formats utilized for OFDM control channels. Three sub-tiles (e.g., R-ODCCH sub-tiles) are depicted: namely, a sub-tile 602 that includes 8 pilots, a sub-tile 604 that includes 12 pilots, and a sub-tile 606 that includes 16 pilots. The formats shown in sub-tiles 602-606 can be optimized across various channel models. Moreover, quadrature phase shift keying (QPSK) with a punctured 256 state convolutional code can be employed to achieve a desired spectral efficiency.

Figure 7:
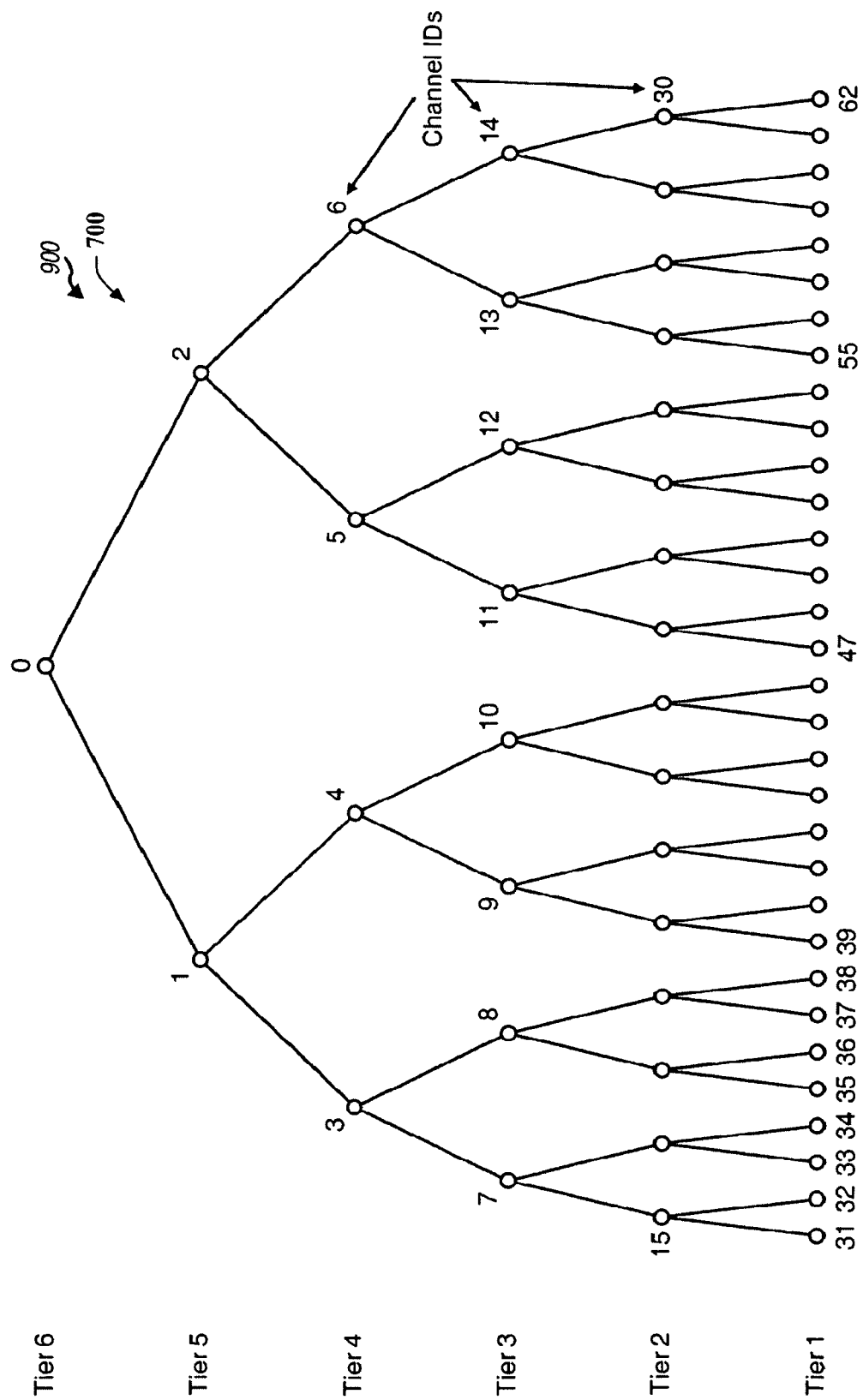
FIG. 7 is an illustration of an example binary channel tree utilized in connection with various aspects described herein.

FIG. 7 illustrates an embodiment of a binary channel tree 700. For the embodiment shown in FIG. 7, S=32 subcarrier sets are available for use. A set of traffic channels can be defined with the 32 subcarrier sets. Each channel is assigned a unique channel ID and is mapped to one or more subcarrier sets in each time interval. For example, a channel can be defined for each node in channel tree 700. The channels can be sequentially numbered from top to bottom and from left to right for each tier. The largest channel corresponding to the topmost node is assigned a channel ID of 0 and is mapped to all 32 subcarrier sets. The 32 traffic channels in the lowest tier 1 have channel IDs of 31 through 62 and are called base traffic channels. Each base channel is mapped to one subcarrier set. The number of nodes and physical channels per node can vary based upon system design and use. It can also be dynamic.

The tree structure shown in FIG. 7 places certain restrictions on the use of the traffic channels for an orthogonal system. For each channel that is assigned, all channels that are subsets (or descendants) of the assigned channel and all channels for which the assigned channel is a subset are restricted. The restricted channels are not used concurrently with the assigned channel so that no two channels use the same subcarrier set at the same time.

To enable efficient scheduling of control channels and data channels, the channel IDs of control channels (e.g., OFDM control channels) can be broadcast, and the assignment of data channels can be multicast or unicast to mobile devices. Thus, those channel IDs that are part of a data assignment to a mobile device are broadcast as control channel usage, and are not used for data. Hence, a higher logical node on the tree that encompasses a lower node assigned for control can be used in the data assignment to a mobile device, thereby saving assignment overhead and potentially leading to simplification.

For example, the following information can be included in a superframe preamble: (i) a common pilot channel; (ii) a broadcast channel, including system and configuration information; (iii) an acquisition pilot channel used to acquire timing and other information; and (iv) an other sector interference channel, which includes indicators from the sector of its measured interference with respect to other sectors. Further, in certain aspects, messages for channels in the superframe preamble can span multiple superframe preambles of different superframes. This can be utilized to improve decoding capability by allocating greater resources to certain high priority messages.

Figure 8:
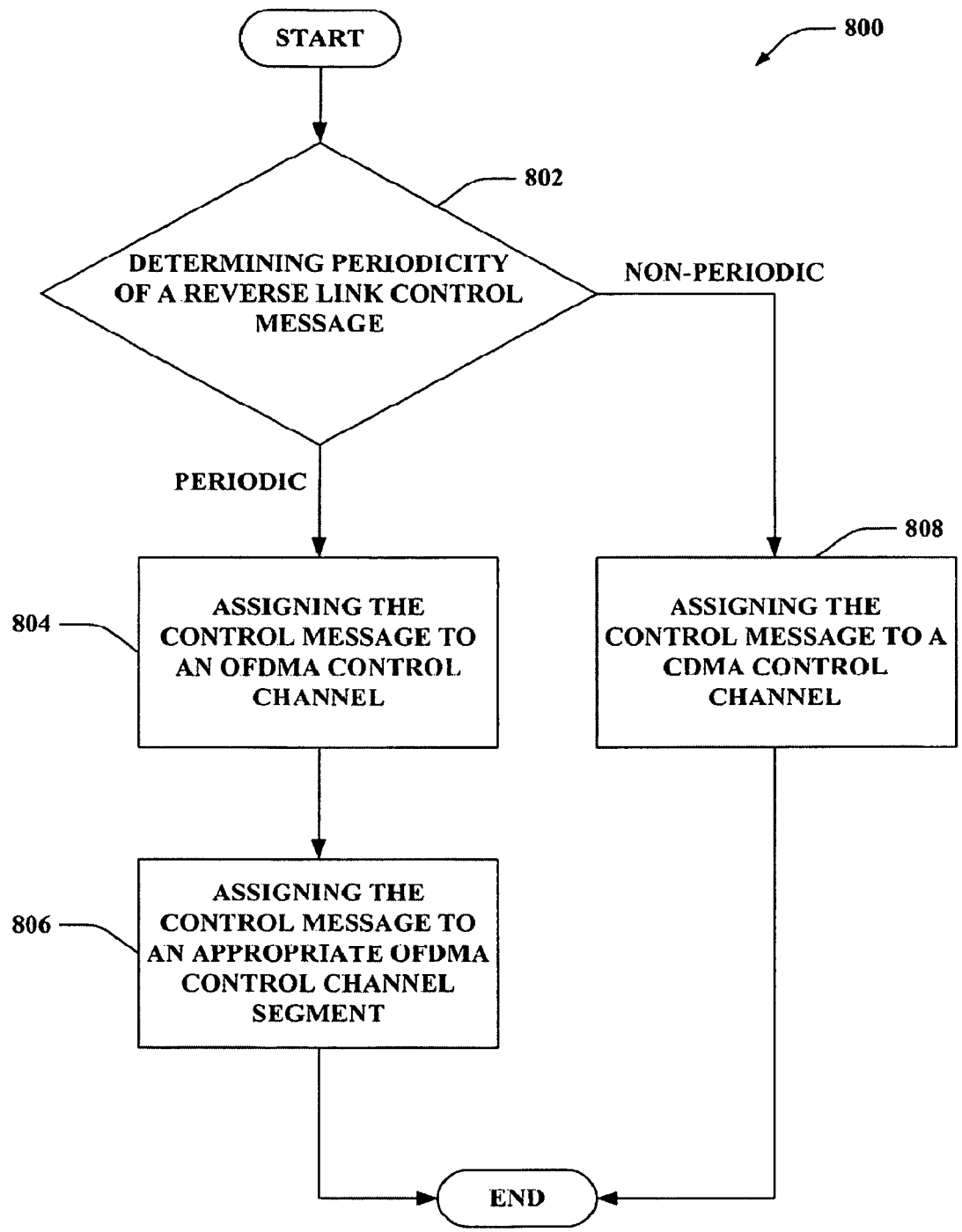
FIG. 8 is an illustration of an example methodology that facilitates assigning control messages to an appropriate reverse link control channel.
Figure 9:
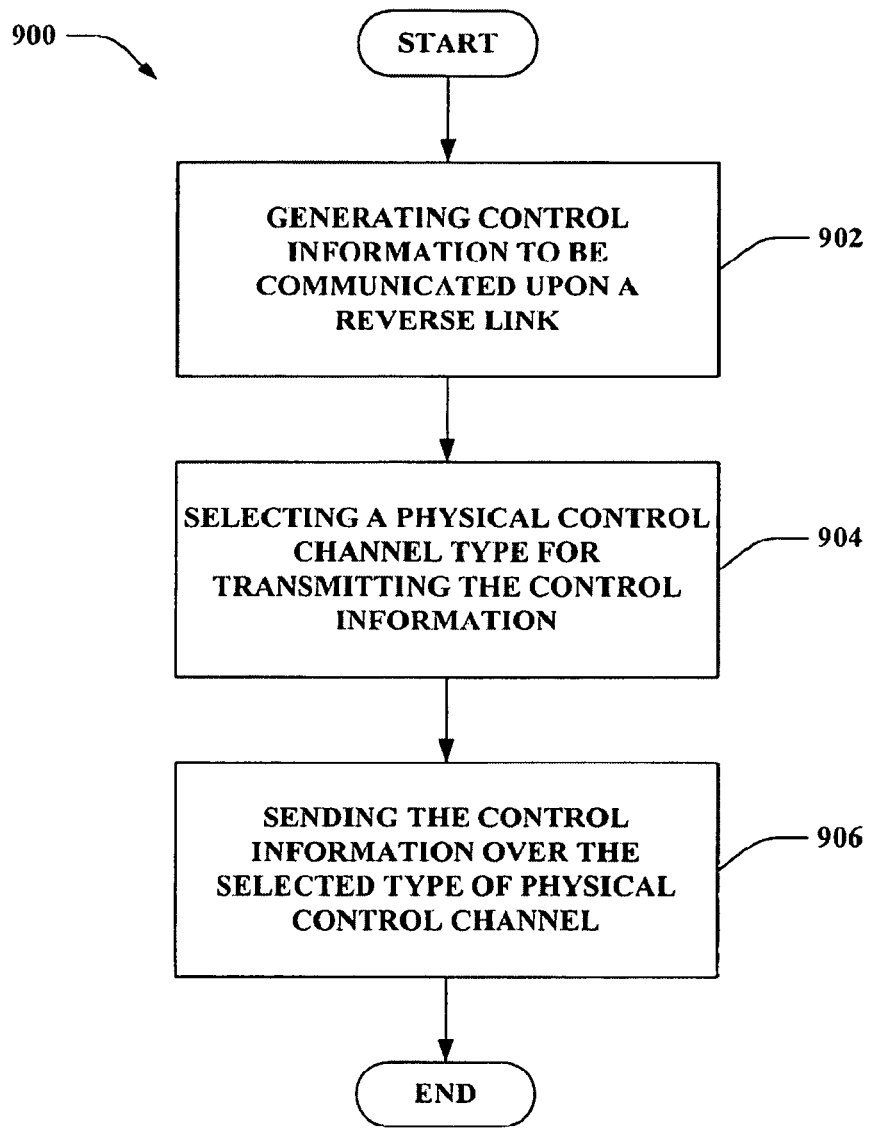
FIG. 9 is an illustration of an example methodology that facilitates transmitting control information upon a reverse link in a wireless communication system.
Figure 10:
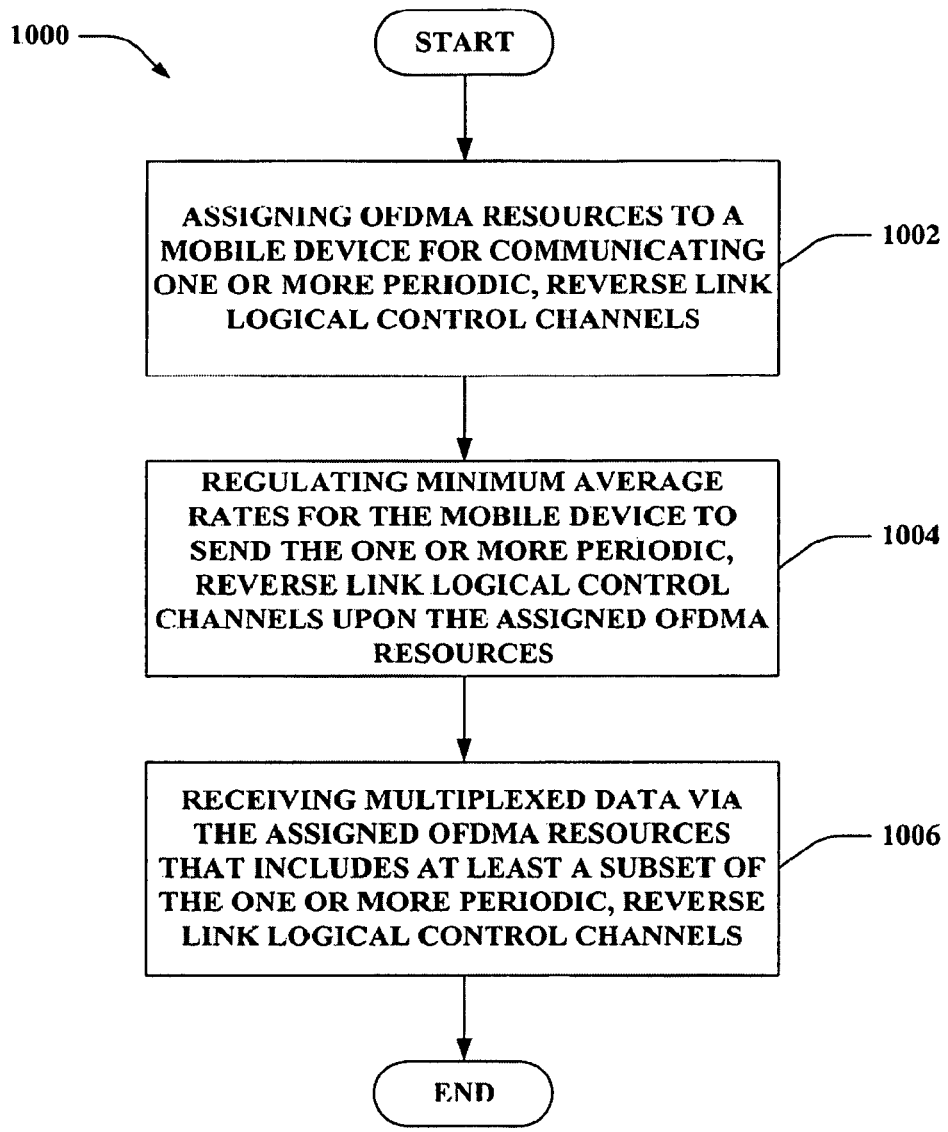
FIG. 10 is an illustration of an example methodology that facilitates obtaining control data via an OFDMA control channel in a wireless communication system.

Referring to FIGS. 8-10, methodologies relating to utilizing OFDMA control channels and CDMA control channels to communicate control information in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Turning to FIG. 8, illustrated is a methodology 800 that facilitates assigning control messages to an appropriate reverse link control channel. At 802, a periodicity of a reverse link control message (e.g., logical control channel) can be determined. If the control message is determined to be periodic, then the methodology 800 continues to 804. At 804, the control message can be assigned to an OFDMA control channel (e.g., when the control message is periodic). The OFDMA control channel can be a physical control channel. At 806, the control message can be assigned to an appropriate OFDMA control channel segment. The OFDMA physical control channel can be one sub-tile of two or more sub-tiles from two or more different tiles assigned to a mobile device, one or more groups of subcarriers, one or more subcarrier by OFDM symbol segments, or the like.

If the control message is determined to be non-periodic at 802, then the methodology can continue to 808. At 808, the control message can be assigned to a CDMA control channel. The CDMA control channel can be a physical control channel. For instance, event driven logical channels can be assigned to a CDMA control channel. The CDMA control channel can be any of one or more tiles, one or more groups of subcarriers, one or more subcarrier by OFDM symbol segments where multiple mobile devices can use different orthogonal codes, scrambling codes, quasi-orthogonal codes or the like to transmit on the same physical resources.

The periodicity can be based upon instructions received from a base station (e.g., dynamically, via broadcast or unicast transmission, during communication session set-up, . . . ). Further, the periodicity can be based upon a type of control message (e.g., type of logical channel) to be transmitted, which can be identified from instructions from a base station or known a priori as a function of channel type.

While periodicity can be a factor for determining the type of control channel to employ, according to other examples, an identity of the base station to which the logical control channel is being directed can be considered for selecting the type of control channel. For instance, whether the logical control channel is being sent to a serving sector or a non-serving sector can be evaluated to determine whether to utilize an OFDMA or CDMA control channel. Pursuant to another illustration, transmissions to non-serving sectors can be limited to one of the OFDMA or CDMA control channel for all logical control channel types; however, the claimed subject matter is not so limited.

Now referring to FIG. 9, illustrated is a methodology 900 that facilitates transmitting control information upon a reverse link in a wireless communication system. At 902, control information can be generated to be communicated upon a reverse link. The control information can be reports that relate to one or more logical control channels. Moreover, periodic reports can be generated as a function of corresponding minimum average rates set forth by a base station. At 904, a physical control channel type can be selected for transmitting the control information. For example, the physical control channel type can be selected as a function of the control information. The physical control channel type can be an OFDMA control channel or a CDMA control channel, for instance. Moreover, the OFDMA control channel (e.g., R-ODCCH segment(s)) can be assigned. The OFDMA control channel can be dedicated to a transmitter that sends the control information and/or the CDMA control channel can be shared by a plurality of transmitters including the transmitter that sends the control information. Further, the selection can be effectuated based upon characteristics of the control information (e.g., type of logical control channel report), instructions received from a base station, a time at which transmission occurs, and so forth. At 906, the control information can be sent over the selected type of physical control channel. For instance, one or more logical control channel reports can be multiplexed upon the OFDMA control channel.

According to an illustration, the control information can be a report that relates to a logical control channel. For instance, the report can be generated according to a predetermined transmission schedule. Further, the logical control channel can be transmitted periodically. Moreover, an OFDMA control channel can be selected as the physical control channel type for transmitting the control information. Pursuant to another example, the report can be generated due to an event, wherein occurrence of the event lacks a predetermined schedule. As such, transmission of the logical control channel can be triggered by the occurrence of the event. Further, a CDMA control channel can be selected as the physical control channel type for transmitting the control information.

Turning to FIG. 10, illustrated is a methodology 1000 that facilitates obtaining control data via an OFDMA control channel in a wireless communication system. At 1002, OFDMA resources can be assigned to a mobile device for communicating one or more periodic, reverse link logical control channels. For instance, a dedicated R-ODCCH segment can be assigned (or de-assigned) to the mobile device. Further, an assignment can be sent to the mobile device that specifies information related to an R-ODCCH segment ID within an interlace, an interlace index, R-ODCCH periodicity and phase, and so forth. Moreover, according to an example, the one or more periodic, reverse link logical control channels can include r-cqich, r-reqch, r-sfch, r-bfch, scw r-mqich, mcw r-mqich, and the like. At 1004, minimum average rates for the mobile device to send the one or more periodic, reverse link logical control channels upon the assigned OFDMA resources can be regulated. At 1006, multiplexed data can be received via the assigned OFDMA resources that includes at least a subset of the one or more periodic, reverse link logical control channels. Moreover, event driven logical control channel(s) can be obtained via a CMDA control channel.

It will be appreciated that, in accordance with one or more aspects described herein, inferences can be made regarding utilizing various types of physical control channels. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a type of physical control channel to employ for transmitting a logical control channel report. By way of further illustration, an inference can be made related to determining which logical control channel report to include in a multiplexed signal sent via an OFDMA control channel. It will be appreciated that the foregoing examples are illustrative in nature and are not intended to limit the number of inferences that can be made or the manner in which such inferences are made in conjunction with the various embodiments and/or methods described herein.

Figure 11:
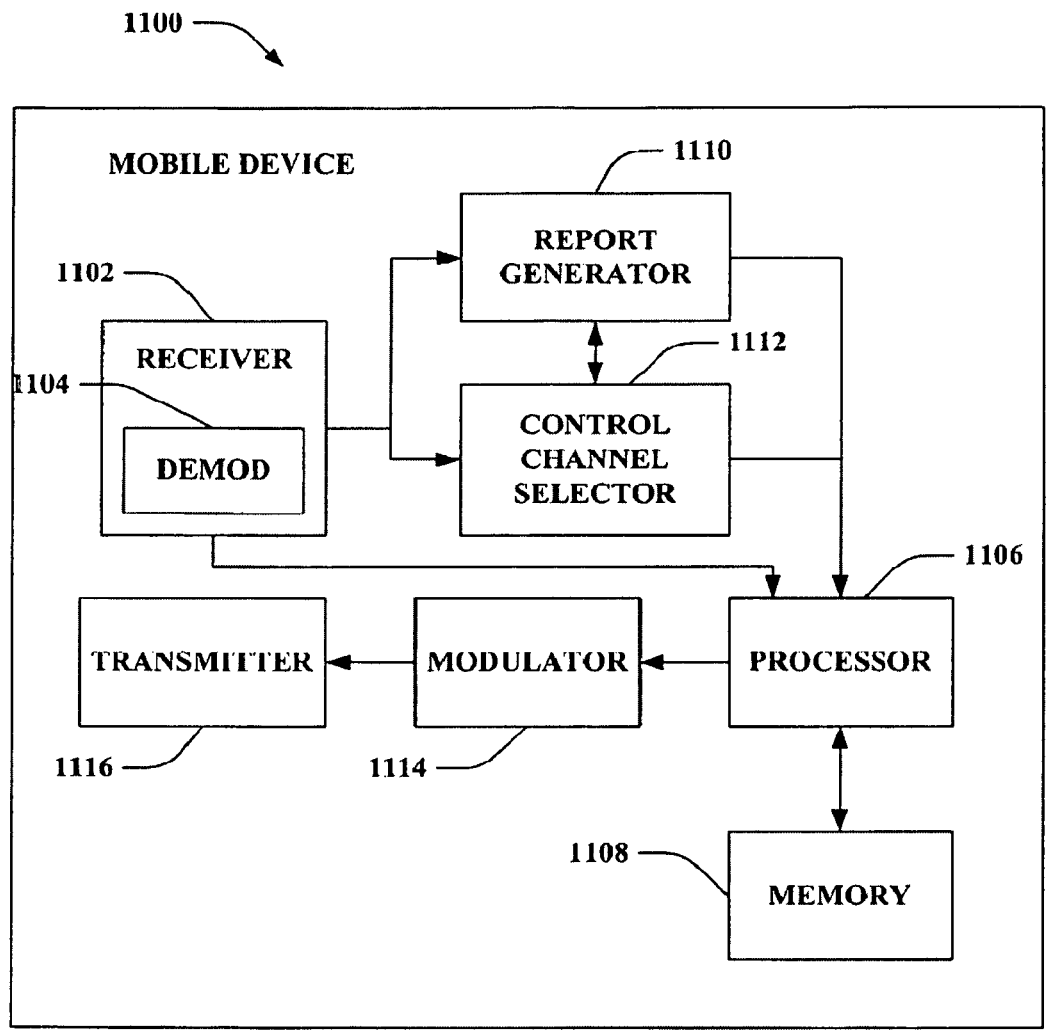
FIG. 11 is an illustration of an example mobile device that facilitates utilizing various types of physical control channels in a wireless communication system.

FIG. 11 is an illustration of a mobile device 1100 that facilitates utilizing various types of physical control channels in a wireless communication system. Mobile device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, data associated with analyzed pilots, and any other suitable information for generating logical control channel report(s). Memory 1108 can additionally store protocols and/or algorithms associated with identifying a type of physical control channel (e.g., OFDMA, CDMA, . . . ) upon which to communicate the generated logical control channel report(s).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a report generator 1110 that can utilize signals obtained by receiver 1102 to yield various logical control channel reports. For instance, report generator 1110 can generate periodic reports and/or event driven reports. Moreover, periodic reports can be yielded with at least a minimum average periodicity obtained by receiver 1102 (e.g., from a base station). Additionally, a control channel selector 1112 can identify a physical control channel type upon which to communicate the report(s) yielded by report generator 1110. For instance, reports can be sent via an OFDMA control channel or a CDMA control channel. Control channel selector 1112 can select the type of physical control channel as a function of the type of report (e.g., characteristics of a logical control channel), a received instruction, a latency of a request, and so forth. Mobile device 1100 still further comprises a modulator 1114 and a transmitter 1116 that transmits the signal to, for instance, a base station, another mobile device, etc. Although depicted as being separate from the processor 1106, it is to be appreciated that report generator 1110, control channel selector 1112 and/or modulator 1114 can be part of processor 1106 or a number of processors (not shown).

Figure 12:
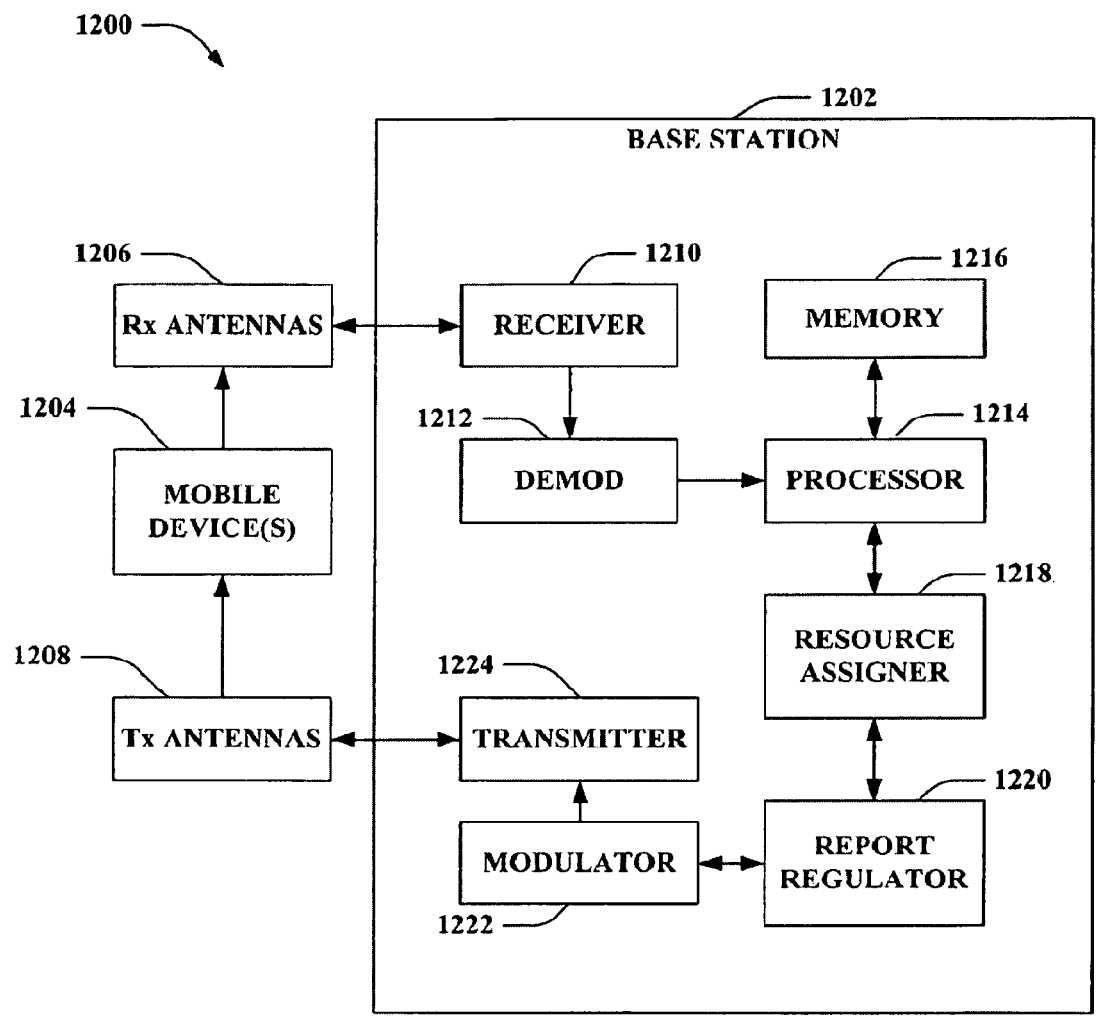
FIG. 12 is an illustration of an example system that facilitates assigning OFDMA control channel resources to mobile device(s) in a wireless communication environment.

FIG. 12 is an illustration of a system 1200 that facilitates assigning OFDMA control channel resources to mobile device(s) in a wireless communication environment. System 1200 comprises a base station 1202 (e.g., access point, . . . ) with a receiver 1210 that receives signal(s) from one or more mobile devices 1204 through a plurality of receive antennas 1206, and a transmitter 1222 that transmits to the one or more mobile devices 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related to generating pilot(s), data to be transmitted to or received from mobile device(s) 1204 (or a disparate base station (not shown)), and/or any other suitable information related to performing the various actions and functions set forth herein. Processor 1214 is further coupled to a resource assigner 1218 that generates assignment messages that can be communicated to mobile device(s) 1204. Resource assigner 1218, for instance, can assign and/or de-assign reserved OFDMA control channel resources as described herein.

Resource assigner 1218 can be operatively coupled to a report regulator 1220 that controls minimum average rates at which various reports (e.g., logical control channel reports) are to be communicated from mobile device(s) 1204 to base station 1202. Report regulator 1220 can further be coupled to a modulator 1222 (e.g., resource assignments and/or minimum average rate related data can be provided to modulator 1222). Modulator 1222 can multiplex the assignment(s) and/or minimum average rate related data for transmission by a transmitter 1226 through antenna 1208 to mobile device(s) 1204. Although depicted as being separate from the processor 1214, it is to be appreciated that resource assigner 1218, report regulator 1220 and/or modulator 1222 can be part of processor 1214 or a number of processors (not shown).

Figure 13:
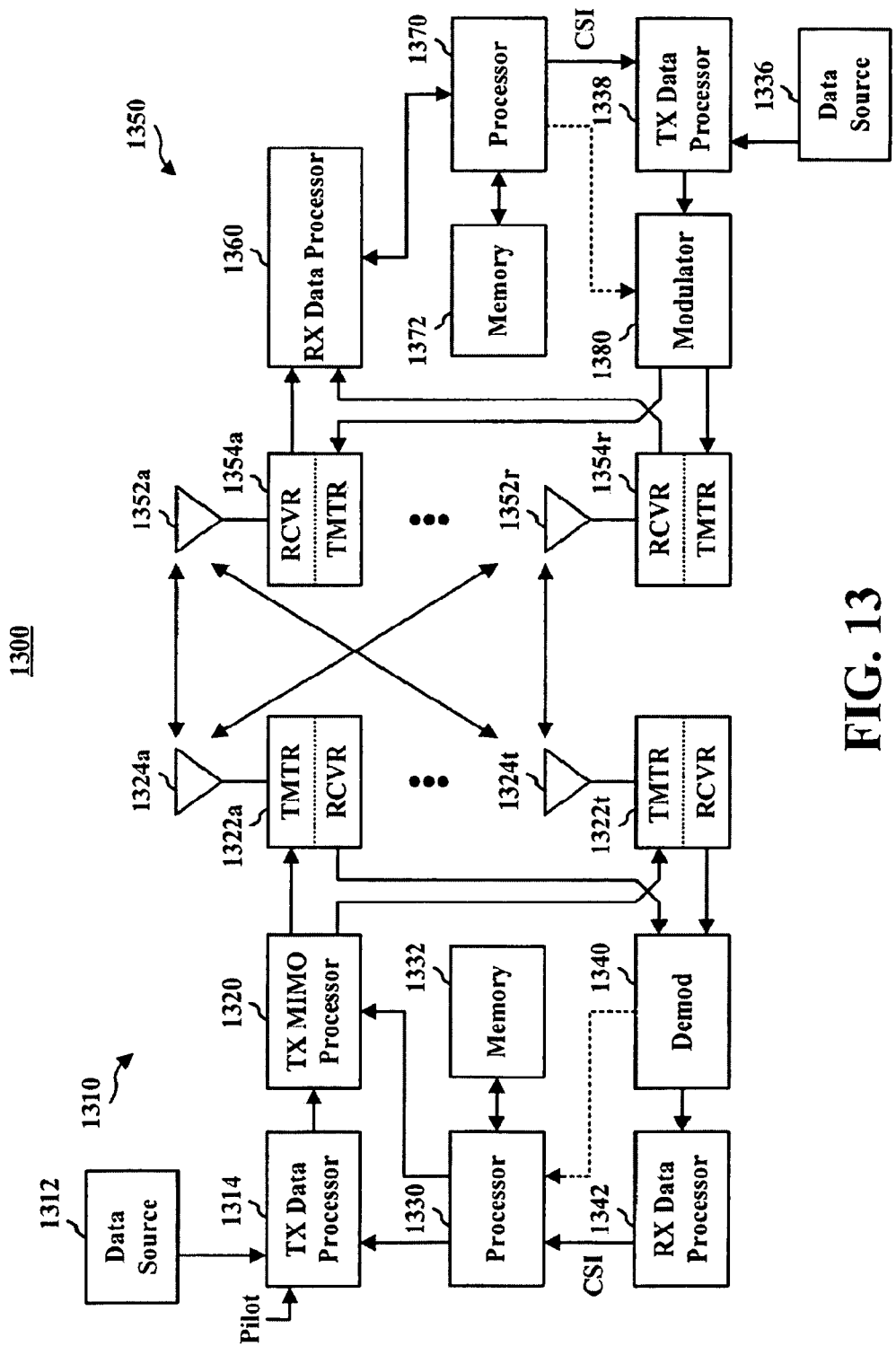
FIG. 13 is an illustration of an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-2, 11-12, and 14-15) and/or methods (FIGS. 8-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by NR antennas 1352a through 1352r and the received signal from each antenna 1352 is provided to a respective receiver (RCVR) 1354a through 1354r. Each receiver 1354 conditions (e.g., filters, amplifies, and down-converts) a respective signal, digitizes the conditioned signal to provide samples, and further processes the samples to provide a corresponding "received" symbol stream.

An RX data processor 1360 can receive and process the NR received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which available technology to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
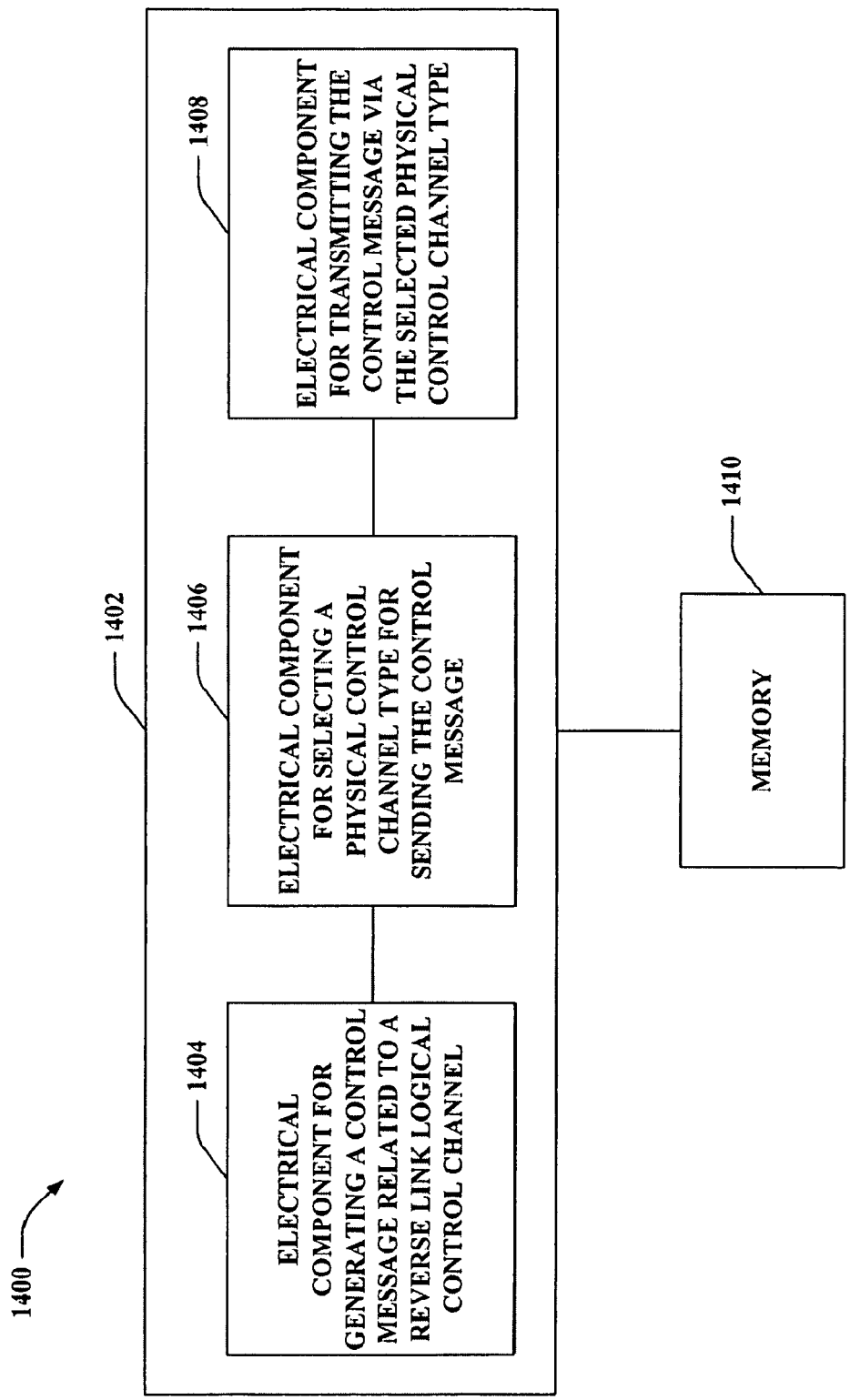
FIG. 14 is an illustration of an example system that enables communicating control information over a reverse link in a wireless communication environment.

With reference to FIG. 14, illustrated is a system 1400 that enables communicating control information over a reverse link in a wireless communication environment. For example, system 1400 can reside at least partially within a mobile device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for generating a control message related to a reverse link logical control channel 1404. Further, logical grouping 1402 can comprise an electrical component for selecting a physical control channel type for sending the control message 1406. For instance, selection of the physical control channel type can be a function of the control message. Moreover, logical grouping 1402 can include an electrical component for transmitting the control message via the selected physical control channel type 1408. For example, the information can be included in a PDR associated with each pilot. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
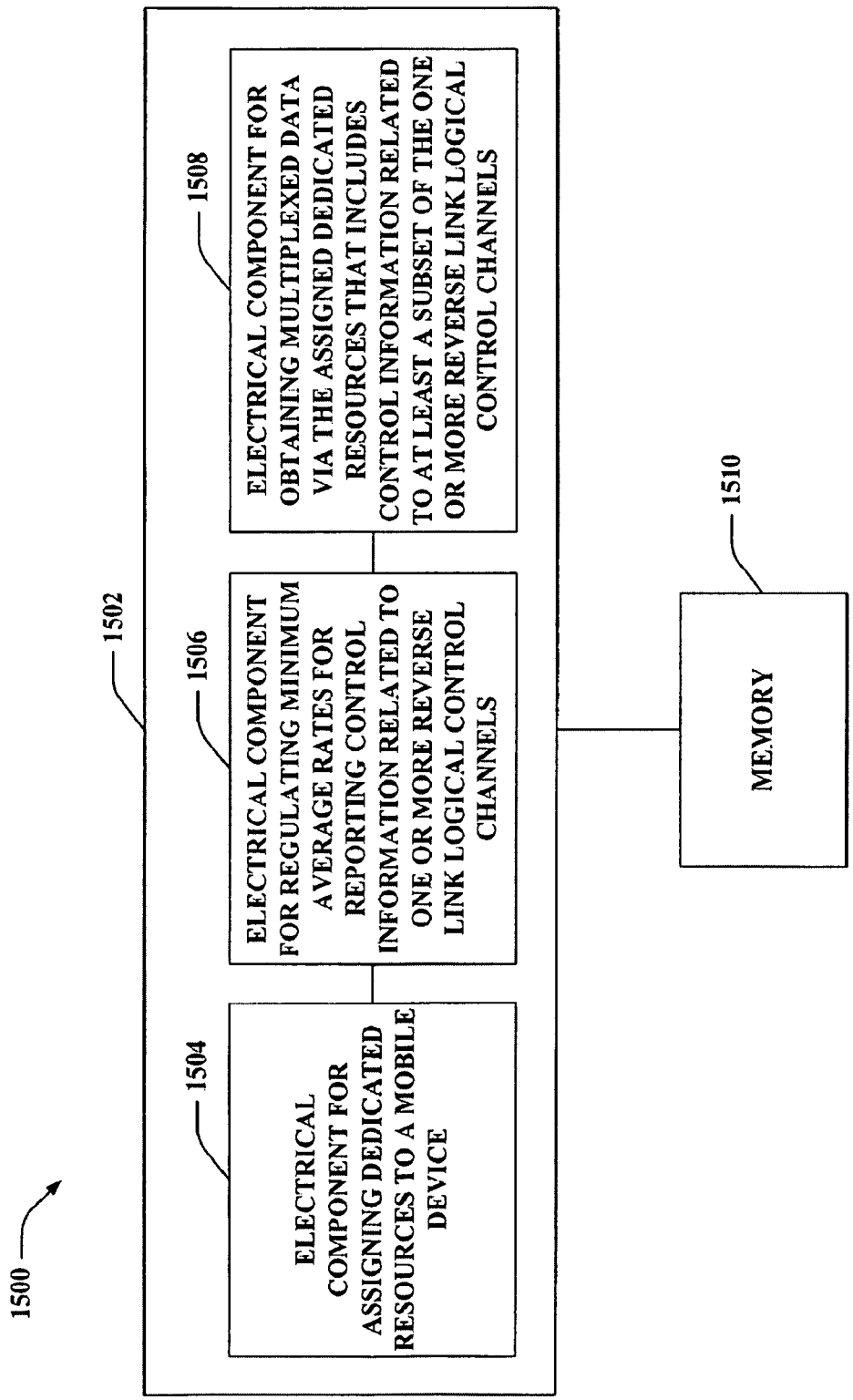
FIG. 15 is an illustration of an example system that enables assigning reverse link OFDMA control channel resources in a wireless communication environment.

Turning to FIG. 15, illustrated is a system 1500 that enables assigning reverse link OFDMA control channel resources in a wireless communication environment. System 1500 can reside at least partially within a base station, for instance. As depicted, system 1500 includes functional blocks that can represent functions implemented by a processor, software, or combination thereof (e.g., firmware). System 1500 includes a logical grouping 1502 of electrical components that can act in conjunction. Logical grouping 1502 can include an electrical component for assigning dedicated resources to a mobile device 1504. For example, the dedicated resources can be OFDMA control channel segment(s). Moreover, logical grouping 1502 can include an electrical component for regulating minimum average rates for reporting control information related to one or more reverse link logical control channels 1506. Further, logical grouping 1502 can include an electrical component for obtaining multiplexed data via the assigned dedicated resources that includes control information related to at least a subset of the one or more reverse link logical control channels 1508. Additionally, system 1500 can include a memory 1510 that retains instructions for executing functions associated with electrical components 1504, 1506, and 1508. While shown as being external to memory 1510, it is to be understood that electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates transmitting control information upon a reverse link in a wireless communication system, comprising:
   generating control information to be communicated upon a reverse link;
   selecting a physical control channel type for transmitting the control information as a function of the control information; and
   sending the control information over the selected type of physical control channel.

2. The method of claim 1, wherein the physical control channel type is one of an OFDMA control channel or a CDMA control channel.

3. The method of claim 2, wherein the OFDMA control channel is dedicated to a transmitter that sends the control information.

4. The method of claim 2, wherein the CDMA control channel is shared by a plurality of transmitters including a transmitter that sends the control information.

5. The method of claim 1, wherein the control information is a report that relates to a logical control channel.

6. The method of claim 5, further comprising:
generating the report according to a predetermined transmission schedule;
transmitting the logical control channel periodically; and
selecting an OFDMA control channel as the physical control channel type for transmitting the control information.

7. The method of claim 5, further comprising:
generating the report due to an event, wherein occurrence of the event lacks a predetermined schedule;
triggering transmission of the logical control channel based on the occurrence of the event; and
selecting a CDMA control channel as the physical control channel type for transmitting the control information.

8. The method of claim 1, further comprising multiplexing control information related to one or more logical control channels upon a selected OFDMA control channel.

9. The method of claim 1, further comprising sending the control information over an OFDMA control channel, wherein the OFDMA control channel includes two sub-tiles from two disparate tiles.

10. An apparatus that operates in a wireless communication system, the apparatus comprising:
at least one processor configured to generate control information to be sent via a reverse link, select a physical control channel type for sending the control information as a function of the control information, and transmit the control information over the selected type of physical control channel; and
a memory coupled to the at least one processor.

11. The apparatus of claim 10, wherein the physical control channel type is one of an OFDMA control channel or a CDMA control channel.

12. The apparatus of claim 11, wherein the OFDMA control channel is dedicated to a transmitter that transmits the control information and the CDMA control channel is shared by a plurality of transmitters including the transmitter that transmits the control information.

13. The apparatus of claim 10, wherein the control information is a report that relates to a logical control channel.

14. The apparatus of claim 13, wherein the at least one processor is further configured to generate the report according to a predetermined transmission schedule, transmit the logical control channel periodically, and select an OFDMA control channel as the physical control channel type for transmitting the control information.

15. The apparatus of claim 13, wherein the at least one processor is further configured to generate the report due to an event that occurs according to a non-predetermined schedule, trigger transmission of the logical control channel based on the occurrence of the event, and select a CDMA control channel as the physical control channel type for the control information.

16. The apparatus of claim 10, wherein the at least one processor is further configured to multiplex control information related to one or more logical control channels upon a selected OFDMA control channel.

17. The apparatus of claim 10, wherein the at least one processor is further configured to transmit the control information over an OFDMA control channel, wherein the OFDMA control channel includes two sub-tiles from two disparate tiles.

18. A wireless communications apparatus that enables communicating control information over a reverse link in a wireless communication environment, comprising:
means for generating a control message related to a reverse link logical control channel;
means for selecting a physical control channel type for sending the control message as a function of the control message; and
means for transmitting the control message via the selected physical control channel type.

19. The wireless communications apparatus of claim 18, wherein the physical control channel type is one of an OFDMA control channel or a CDMA control channel.

20. The wireless communications apparatus of claim 19, wherein the OFDMA control channel is dedicated and the CDMA control channel is shared.

21. The wireless communications apparatus of claim 18, further comprising means for selecting an OFDMA control channel as the physical control channel type for transmitting the control message, wherein the control message is associated with a periodical reverse link logical control channel.

22. The wireless communications apparatus of claim 18, further comprising means for selecting a CDMA control channel as the physical control channel type for transmitting the control message, wherein the control message is associated with an event driven reverse link logical control channel.

23. The wireless communications apparatus of claim 18, further comprising means for multiplexing control messages related to one or more reverse link logical control channels upon a selected OFDMA control channel.

24. The wireless communications apparatus of claim 18, further comprising means for transmitting the control message over an OFDMA control channel, wherein the OFDMA control channel includes two sub-tiles from two differing tiles and each of the two sub-tiles includes N subcarriers by M OFDM symbols.

25. A computer program product, comprising:
a non-transitory computer-readable medium storing computer code executable by a processor, the medium comprising:
code for causing at least one computer to generate a control message related to a reverse link logical control channel;
code for causing the at least one computer to select a physical control channel type for sending the control message as a function of the control message, the physical control channel type being one of an OFDMA control channel or a CDMA control channel; and
code for causing the at least one computer to transmit the control message via the selected physical control channel type.

26. The computer program product of claim 25, the computer-readable medium further comprising code for causing the at least one computer to select the OFDMA control channel as the physical control channel type for transmitting the control message, wherein the control message is associated with a periodical reverse link logical control channel.

27. The computer program product of claim 25, the computer-readable medium further comprising code for causing the at least one computer to select the CDMA control channel as the physical control channel type for transmitting the control message, wherein the control message is associated with an event driven reverse link logical control channel.

28. The computer program product of claim 25, the computer-readable medium further comprising code for causing the at least one computer to multiplex control messages related to one or more reverse link logical control channels upon a selected OFDMA control channel.

29. The computer program product of claim 25, the computer-readable medium further comprising code for causing the at least one computer to transmit the control message over an OFDMA control channel, wherein the OFDMA control channel includes two sub-tiles from two differing tiles and each of the two sub-tiles includes one quarter of the resources from the corresponding differing tiles.

* * * * *